United States Patent Office 3,711,519
Patented Jan. 16, 1973

---

3,711,519
PHENYL ETHERS
Ladislav Dolejs, Kitka Kahovcova, Karel Slama, and Frantisek Sorm, Prague, Czechoslovakia, assignors to Ceskoslovenska Akademie Ved, Prague, Czechoslovakia
No Drawing. Filed Jan. 22, 1971, Ser. No. 109,024
Claims priority, application Czechoslovakia,
Jan. 29, 1970, 652/70
Int. Cl. C07d 1/18
U.S. Cl. 260—348 R    4 Claims

ABSTRACT OF THE DISCLOSURE

Novel phenyl ethers, preparation thereof and their use for insect control.

---

This invention relates to novel ethers possessing juvenile hormone actitvity of the Formula I:

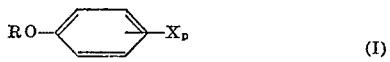

wherein, R is alkyl, alkenyl or epoxidized alkenyl group containing 7 to 13 carbon atoms; X is halo or nitro and $p$ is the positive integer one to three.

The compounds of Formula I are prepared by a process which comprises treatment of a phenol of Formula II:

with an alkylating agent R—Z, in which Z is the residue of the alkylating agent, such as bromo or chloro, preferably in an organic solvent and in the presence of a base, such as potassium carbonate or alkali alkoxide.

Epoxidation of compounds of Formula I, wherein R is alkenyl, by an organic peracid leads often to a product possessing an increased juvenile effect.

The compounds of Formula I exhibit a considerable physiological activity on larval development and reproduction of some insect species. The observed activity is similar to that of the insect juvenile hormone which controls metamorphosis and reproduction. For closely related substances of an analogous activity, see the phenol derivatives substituted by a methylenedioxy or an alkoxycarbonyl group, W. S. Bowers, Science 164, 323 (1969).

The novel compounds of Formula I are useful for the control of insects. They are preferably applied to the immature insect, namely—during the embryo, larvae or pupae stage in view of their ability to inhibit metamorphosis and otherwise cause abnormal development. These compounds are effective control agents for Hempteran, such as Lygaeidae, Miridae and Pyrrhocoridae; Coleopeteran, such as Tenebrionidae; Lepidopteran, such as Pyralidae, Noctiidae and Gelechiidae; Dipteran, such as mosquitos; Orthoptera, such as roaches; and Homoptera, such as aphids. The compounds can be applied at low dosage levels of the order of 0.001 µg. to 25 µg. per insect. Suitable carrier substances include liquid or solid carriers, such as water, mineral or vegetable oils, talc, silica and natural or synthetic resin. The control of insects in accordance with the present invention is accomplished by spraying, dusting or exposing the insects to the vapor of the novel compounds. Generally, a concentration of less than 50% of the active compound is employed. The formulation can include insect attractants, emulsifying agents and wetting agents to assist in the application and efficiency of the active ingredient.

The present invention is illustrated by the following examples.

EXAMPLE 1

Preparation of geranyl p-nitrophenyl ether-p-nitrophenol (2 g.) is dissolved in dimethylformamide (10 ml.). Anhydrous potassium carbonate (2 g.) and geranyl bromide (3.1 g.) are then added to the solution. The reaction mixture is kept at 50° C. for 12 hours, diluted with water, and extracted with ether. The ethereal extract is washed with 5% aqueous sodium hydroxide and dried over sodium sulfate. The product (1.3 g.) is obtained by distillation at 0.1 mm. Hg and bath temperature of 165° C. The mass spectrum of the product exhibits characteristic ions of m./e. 275 (molecular), 69 and 137.

EXAMPLE 2

Preparation of 6,7-epoxycitronellyl p-nitrophenyl ether-citronellyl p-nitrophenyl ether (1 g.) is added to an ethereal solution of perphthalic acid (1.1 mol equivalent). After 16 hours at 0° C., the reaction mixture is washed with dilute aqueous hydroxide and water and dried over sodium sulfate. The product (0.85 g.) is isolated by column chromatography on silica gel. Mass spectrum of the product exhibits characteristic ions of m./e. 293 (molecular), 192, 153 and 152.

EXAMPLE 3

The process of Example 1 is repeated using citronellyl bromide in place of geranyl bromide to yield citronellyl p-nitrophenyl ether.

EXAMPLE 4

Citronellyl bromide is reacted with each of 3,4-dinitrophenol, 2,4-dinitrophenol, 2-chloro-4-nitrophenol, 2-bromo-4-nitrophenol, 4-chlorophenol, 2,4-dichlorophenol, 3,4 - dichlorophenol, 2,3-dichlorophenol, 2,4,6-trichlorophenol, 2,4,5-trichlorophenol, 2,3,5-trichlorophenol and 2,5,6-trichlorophenol to yield the corresponding substituted phenyl ether.

By use of the process of Example 2, epoxidation of the above ethers is accomplished to yield:

6,7-epoxy-3,7-dimethyloctyl 3,4-dinitrophenyl ether,
6,7-epoxy-3,7-dimethyloctyl 2,4-dinitrophenyl ether,
6,7-epoxy-3,7-dimethyloctyl 2-chloro-4-nitrophenyl ether,
6,7-epoxy-3,7-dimethyloctyl 2-bromo-4-nitrophenyl ether,
6,7-epoxy-3,7-dimethyloctyl 4-chlorophenyl ether,
6,7-epoxy-3,7-dimethyloctyl 2,4-dichlorophenyl ether,
6,7-epoxy-3,7-dimethyloctyl 3,4-dichlorophenyl, ether,
6,7-epoxy-3,7-dimethyloctyl 2,4,6-trichlorophenyl ether,
6,7-epoxy-3,7-dimethyloctyl 2,4,5-trichlorophenyl ether,
6,7-epoxy-3,7-dimethyloctyl 2,3,5-trichlorophenyl ether, and
6,7-epoxy-3,7-dimethyloctyl 2,5,6-trichlorophenyl ether, respectively.

EXAMPLE 5

Each of the 1,5-dimethylhex-4-enyl bromide and 3,7-dimethylnon-6-enyl bromide is reacted with 4-nitrophenol and 4-chlorophenol according to the process of Example 1 to yield 1,5-dimethylhex-4-enyl p-nitrophenyl ether, 3,7-dimethylnon-6-enyl p-nitrophenyl ether, 1,5-dimethylhex-4-enyl p-chlorophenyl ether and 3,7-dimethylnon-6-enyl p-chlorophenyl ether.

Each of the alkenyl phenyl ethers is epoxidized using the process of Example 2 to yield 4,5-epoxy-1,5-dimethylhexyl p-nitrophenyl ether, 6,7-epoxy-3,7-dimethylnonyl p-nitrophenyl ether, 4,5-epoxy-1,5-dimethylhexyl p-chlorophenyl ether and 6,7-epoxy-3,7-dimehylnonyl p-chlorophenyl ether.

The juvenile hormone activity of substances according to the present invention was tested on several insect species. The substances were applied either topically in 1 microliter of acetone to injured abdomen cuticle or injected in 1 microliter of olive oil into the body. Tests were performed on freshly molted last instar larvae or freshly molted pupae. The juvenile activity was evaluated from the degree of morphological change induced. The maximum activity consists in the formation of supernumerary extra-larval instars or secondary pupal instars. The control specimens form normal adults. The activity of 6,7-epoxy-3,7-dimethyloctyl p-nitrophenyl ether is 0.6 in *Pyrrhocoris apterus*, 0.4 in *Dysdercus cingulatus*, 0.1 in *Graphosma italicum*, 10.0 in *Tenebrio molitor* and 1.0 in *Dermestes vulpinus*, expressed in micrograms per specimen.

Compounds of Formula A wherein R is one of the groups:

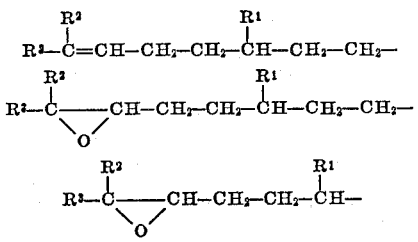

represent a preferred embodiment due to improved stability and specificity of activity over geranyl ethers.

What is claimed is:
1. A compound of the formula

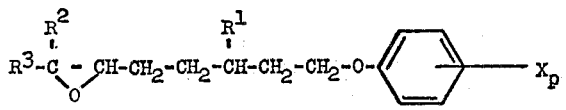

or

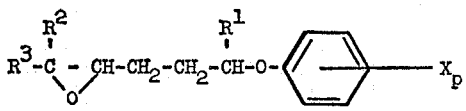

wherein each of $R^1$, $R^2$ and $R^3$ is methyl or ethyl, X is bromo, chloro, fluoro or nitro and $p$ is the positive integer 1 to 3.

2. A compound according to claim 1 wherein R is:

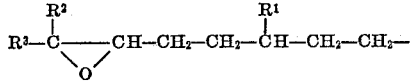

and X is nitro or chloro.

3. A compound according to claim 1 wherein each of $R^1$, $R^2$ and $R^3$ is methyl; X is in the para position and $p$ is one.

4. The compound, 6,7-epoxy-3,7-dimethyloctyl p-nitrophenyl ether, according to claim 1.

References Cited

UNITED STATES PATENTS 3,513,176   5/1970   Andrews et al. _____ 260—348

FOREIGN PATENTS 1,932,062   10/1970   Germany.

OTHER REFERENCES

W. S. Bowers, Science, vol. 164 (Apr. 18, 1969), pp. 323–5.

NORMA S. MILESTONE, Primary Examiner

U.S. Cl. X.R.

260—612 D; 424—278, 340